Nov. 17, 1964  H. BEAVERS  3,157,034
DUAL MASTER CYLINDER
Filed Dec. 4, 1962
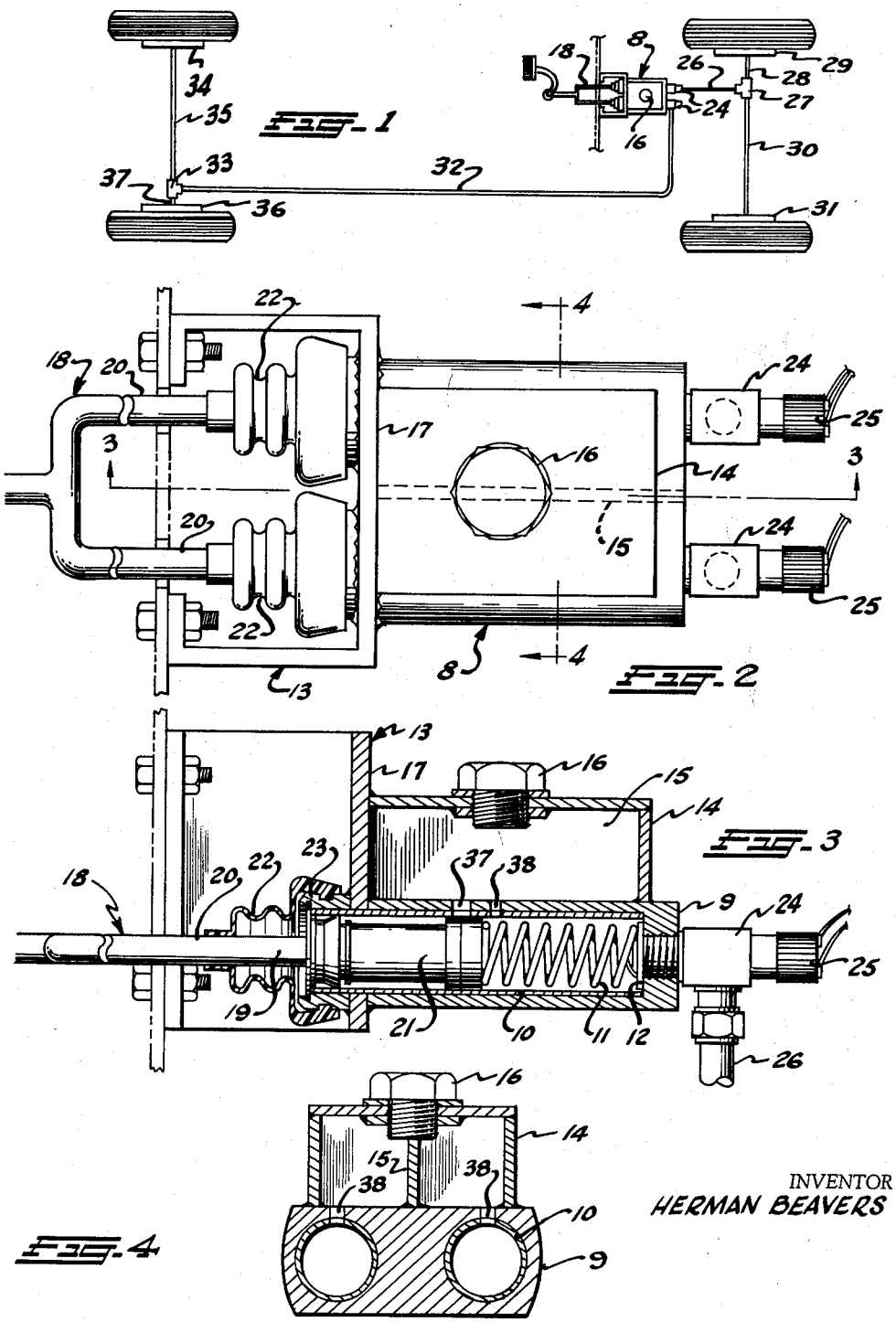
INVENTOR
*HERMAN BEAVERS*

United States Patent Office 3,157,034
Patented Nov. 17, 1964

3,157,034
DUAL MASTER CYLINDER
Herman Beavers, 5585 Garden St., Maple Heights, Ohio
Filed Dec. 4, 1962, Ser. No. 242,253
1 Claim. (Cl. 60—54.6)

This invention relates to automotive vehicles and more particularly to that part of automative vehicles, known as their hydraulic brake system, and to be still more exact, that one part of a hydraulic brake system which is called the "master cylinder."

As everyone having any knowledge or experience of or in the automotive vehicle art knows, there is only one master cylinder in the hydraulic braking system of each automotive vehicle. Should this master cylinder for any reason whatsoever fail, then the safety of all the occupants of the vehicle is in danger of serious accident or death, besides the danger of partial or total destruction of the vehicle.

It is, therefore, an object of this invention to provide a dual master cylinder which, as its name implies, is a master cylinder having, in fact, two separate cylinders operated by a single control and acting as a single cylinder unit.

Another object of this invention is to provide a dual master cylinder for automotive vehicles that will function even though one of its pistons or related parts may fail.

Another object of this invention is to provide a dual master cylinder that is totally enclosed within a single housing thereby simplifying its mounting in a vehicle.

Another object of this invention is to provide a dual master cylinder having parts that are interchangeable with the ordinary master cylinders now on the market.

Another object of this invention is to provide a dual master cylinder for automotive vehicles that can readily replace existing single master cylinders now in everyday use.

Still another object of this invention is to provide a dual master cylinder that can readily be manufactured by any company already manufacturing master cylinders without the necessity of adding expensive machinery to its plant.

Other and further objects and advantages of this dual master cylinder will be hereinafter described, and the novel features thereof defined in the appended claim.

Referring to the drawing:

FIGURE 1 is a top diagrammatic view of the four wheels of a motor vehicle connected together by hydraulic lines connected to a dual master cylinder.

FIGURE 2 is an enlarged top view of this invention.

FIGURE 3 is a sectional view of this invention taken substantially along line 3—3 of FIGURE 2, as viewed in the direction indicated by the arrows.

FIGURE 4 is a sectional view of this invention taken substantially along line 4—4 of FIGURE 2, as viewed in the direction indicated by the arrows.

Similar reference characters refer to similar parts throughout the several views of the drawing.

Having reference now to the drawing in detail, there is generally indicated by the character 8 a dual master cylinder embodying a steel block 9 that is basically rectangular in all planes and having a pair of horizontally disposed and parallel cylindrical openings therein, one end of each opening being approximately half the diameter of the other end of the same opening. Each one of the aforesaid cylindrical openings is provided with a tubular liner 10 in which is located a coil spring 11 having one end resting against the ledge 12 of the block 9. A mounting bracket 13 that has the basic configuration of a capital letter U when viewed from the top is secured preferably by welding to one end of the aforesaid block 9, as best shown in FIGURES 2 and 3 of the appended drawing where it is also seen that a hydraulic fluid reservoir 14, which is built up from a plurality of flat plates and welded together in the box-like form shown in the appended drawing. A baffle plate 15 is centrally located within the aforesaid hydraulic fluid reservoir 14 as best shown in FIGURE 4 of the appended drawing. A screw type filler plug 16 is centrally located in the top of the reservoir which has one end terminating against the vertical wall 17 of the aforesaid frame 13.

A U-shaped peddle rod 18 has each end 19 of its parallel portions 20 suitably secured to one end of each piston 21, while a flexible rubber boot 22 encompasses each of the two side by side ends of the caps 23. A T-shaped fitting 24 is screwed into each of the aforesaid smaller openings in one end of the block 9. A brake light switch 25 is secured in one of the openings of each T-shaped fitting 24. One of the T-shaped fittings 24 is connected to the front wheel brakes of a vehicle by a hydraulic line 26 which in turn is connected to a T-shaped fitting 27 that has one line 28 going to the left front wheel brake 29 while the other line 30 goes to the right front wheel brake 31. The other one of the T-shaped fittings 24 is connected to a hydraulic line 32 that terminates in a T-shaped fitting 33 which is connected to the left rear wheel brake 34 by means of hydraulic line 35 while the right rear wheel brake 36 is connected to the aforesaid T-shaped fitting 33 by means of hydraulic line 37 all of which is clearly shown in FIGURE 1 of the appended drawing.

The actual method of operation of this novel dual master cylinder is clearly understood by anyone familiar with the automotive arts without further explanation.

Since the aforesaid hydraulic fluid reservoir 14 is made an integral part of the steel block 9, the hydraulic fluid placed within the reservoir flows downward into the two cylinders of this invention through two pairs of openings. One of each pair of openings in the steel block 9 characterized by the reference number 37 and the other by the reference number 38. The action of the aforesaid hydraulic fluid on the pistons 21 need no explanation since this part of the operation of this novel invention is well understood by both the automotive mechanic and people versed in hydraulic mechanism art.

The way in which the invention is secured to the frame of a motor vehicle is also clear to the experienced mechanic when he examines the appended drawing and takes particular notice of FIGURES 1, 2, and 3 where it is shown that this invention is normally bolted onto the frame of a motor vehicle by bolts passing through a portion of both the frame of the vehicle and the U-shaped frame 13 of the aforesaid dual master cylinder 8.

From the foregoing it will now be seen that there is herein provided a dual master cylinder which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, Patents, I have now described the principle of construction and operation of my invention of a dual master cylinder in the form which I personally consider the best embodiment thereof, and what I now claim as my invention and desire to secure by Letters Patent is:

A dual master cylinder of the character described, comprising a mounting bracket which is substantially the shape of a capital letter U when viewed from the top, the ends of said bracket bent inward substantially at right angles, said ends having openings for use in securing the bracket to the firewall of a motor vehicle, a block of steel secured to the central portion of said bracket and extending outwardly from said bracket, a pair of tubular openings extending through said central portion of said bracket and into said block of steel, the normal mechanism of a master cylinder in each tubular opening, a piston rod extending from each master cylinder, and a flexible rubber boot surrounding each piston rod at the outer end of said master cylinder, the flexible rubber boots being within said mounting bracket.

References Cited by the Examiner
UNITED STATES PATENTS

| | | | |
|---|---|---|---|
| 1,707,781 | 4/29 | Blanchard | 60—54.5 |
| 2,332,301 | 10/43 | Cox | 60—54.5 X |
| 2,500,340 | 3/50 | Boulton | 60—54.6 X |
| 2,596,119 | 5/52 | Blackman | 60—54.6 |
| 2,609,067 | 9/52 | Blafield | 65—54.6 X |
| 2,615,304 | 10/52 | Groves | 60—54.6 |
| 2,759,329 | 8/56 | Ponti | 60—54.6 |
| 2,764,176 | 9/56 | Darquier | 60—54.5 X |
| 2,776,734 | 1/57 | Hackett | 60—54.5 X |
| 2,808,703 | 10/57 | Baldwin | 60—54.6 |
| 2,902,121 | 9/59 | Young et al. | 60—54.5 X |

EDGAR W. GEOGHEGAN, *Primary Examiner.*

ROBERT R. BUNEVICH, JULIUS E. WEST,
*Examiners.*